(12) United States Patent
Brooks et al.

(10) Patent No.: US 7,562,024 B2
(45) Date of Patent: Jul. 14, 2009

(54) METHOD AND SYSTEM FOR ADDRESSING CLIENT SERVICE OUTAGES

(75) Inventors: Clifford Brooks, Troy, MI (US); Deborah W. Jakubowski, Rochester, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1189 days.

(21) Appl. No.: 10/465,481

(22) Filed: Jun. 18, 2003

(65) Prior Publication Data

US 2004/0260723 A1    Dec. 23, 2004

(51) Int. Cl.
G06Q 10/00    (2006.01)
G06Q 30/00    (2006.01)

(52) U.S. Cl. .......................................................... 705/1
(58) Field of Classification Search ....................... 705/1
See application file for complete search history.

(56) References Cited

U.S. PATENT DOCUMENTS

| | | | | |
|---|---|---|---|---|
| 5,566,339 A | * | 10/1996 | Perholtz et al. | ............. 713/340 |
| 6,058,355 A | * | 5/2000 | Ahmed et al. | ................. 702/62 |
| 6,137,868 A | * | 10/2000 | Leach | ................... 379/106.01 |
| 6,687,574 B2 | * | 2/2004 | Pietrowicz et al. | .......... 700/293 |
| 6,813,525 B2 | * | 11/2004 | Reid et al. | ..................... 700/19 |
| 6,963,285 B2 | * | 11/2005 | Fischer et al. | ............... 340/635 |

OTHER PUBLICATIONS

Gary Walker, IT Problem Management, Mar. 7, 2001, Prentice Hall.*
Business Editors & Technology Writers Global Connect 2003, Teltone Introduces Rapid Notification Solution, Jun. 10, 2003, Business Wire, p. 1.*
ITIL Glossary, Office of Government Commerce (OGC), Feb. 2003—Version 01, 21 pages, Feb. 2003.
What is Sigma?, The Roadmap to Customer Impact 60, 6 pages, Printed on Feb. 1, 2008.
IBM Dictionary of Computing: DRAFT, 216 pages, Apr. 1999.

* cited by examiner

*Primary Examiner*—Tan Dean D. Nguyen
*Assistant Examiner*—Fonya Long (57) ABSTRACT

According to one embodiment of the present invention, a computerized method for addressing client service outages of a client includes receiving a plurality of predefined parameters of a client service outage, storing the predefined parameters in a central repository, receiving information regarding the client service outage, determining that the client service outage is of a particular severity level in response to the received information, and automatically sending at least some of the information to one or more employees of a service company in response to the determination.

24 Claims, 5 Drawing Sheets

METHOD AND SYSTEM FOR ADDRESSING CLIENT SERVICE OUTAGES

TECHNICAL FIELD OF THE INVENTION

This invention relates in general to client services and, more particularly, to a method and system for addressing client service outages.

BACKGROUND OF THE INVENTION

A challenge for any large information technology ("IT") or business process outsourcing ("BPO") service provider is effective management of the operational environment in minimizing the risk of mission critical outages. In the event a major disruption occurs, there typically can be many difficult hurdles for the service provider, including such things as timely notification, responsibilities, restoration plans, and responsiveness just to name a few. Other IT and BPO service providers have addressed this problem with isolation solutions to individual components of service delivery utilizing commercial-off-the-shelf software, such as REM and Vantive.

SUMMARY OF THE INVENTION

According to one embodiment of the present invention, a computerized method for addressing client service outages of a client includes receiving a plurality of predefined parameters of a client service outage, storing the predefined parameters in a central repository, receiving information regarding the client service outage, determining that the client service outage is of a particular severity level in response to the received information, and automatically sending at least some of the information to one or more employees of a service company in response to the determination.

The present invention may provide one or more technical advantages. Various embodiments of the present invention may provide some, all or none of these technical advantages. One such technical advantage is that planning for a mission critical operation outage gives a client peace of mind. This planning also gives a client an opportunity to identify situations that might otherwise harm their information, infrastructure, productivity, and/or profitability. Another technical advantage is that the proper personnel are notified in a timely manner when a client service outage happens so that corrective and preventive actions may be implemented quickly and efficiently. Not only is responsiveness accelerated, but Mean Time to Restoration ("MTTR") is optimized. A system described herein, according to one embodiment, may be applied for all clients across all service lines, industries and geographies on a global basis.

Other advantages may be readily ascertainable by those skilled in the art from the following figures, description, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF EXAMPLE EMBODIMENTS OF THE INVENTION

Example embodiments of the invention are best understood by referring to FIGS. 1 through 5 of the drawings, like numerals being used for like and corresponding parts of the various drawings.

Figure 1A:
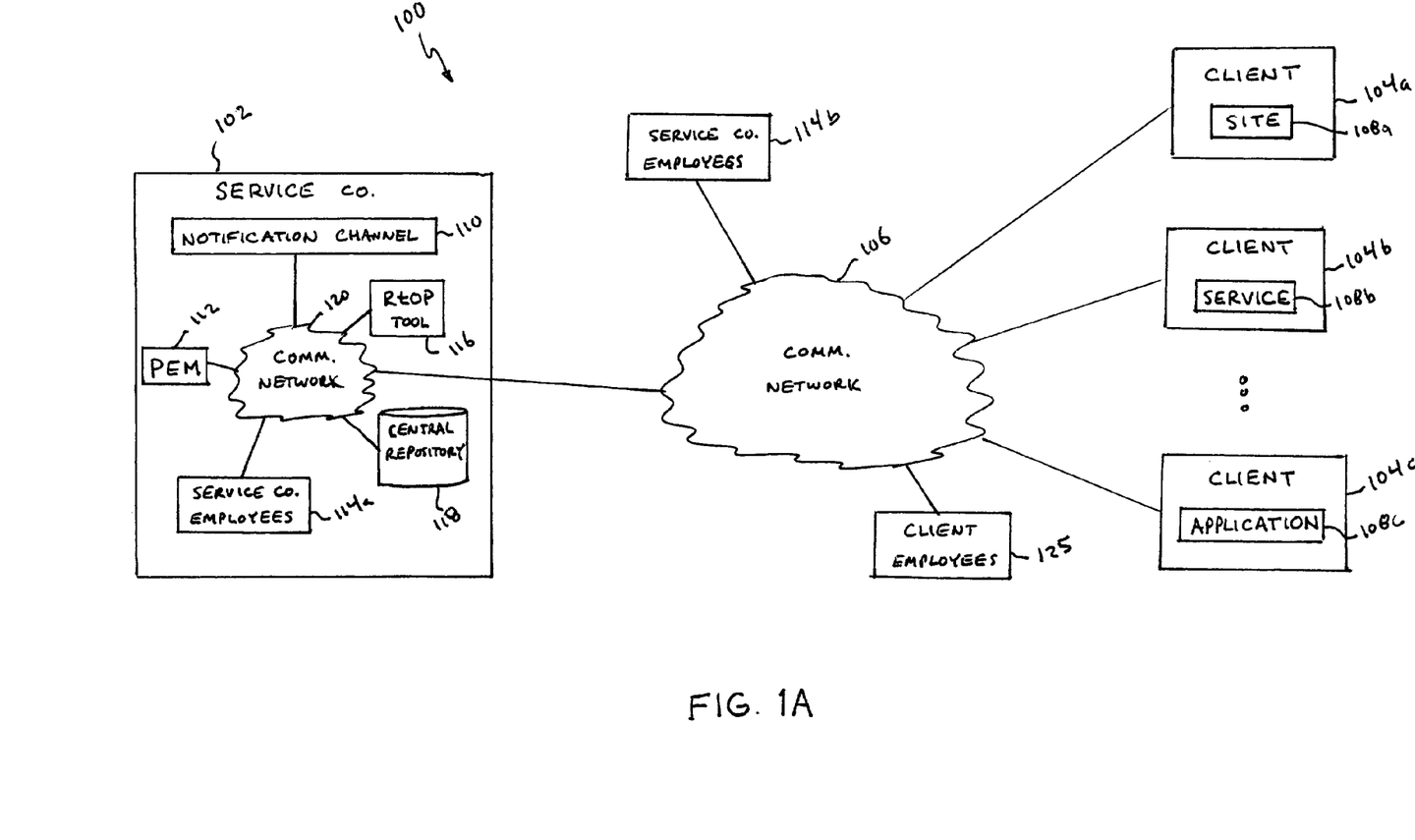
FIG. 1A is a block diagram illustrating a system for addressing a client service outage according to one embodiment of the present invention.

FIG. 1A is a block diagram illustrating a system 100 for addressing client service outages according to one embodiment of the present invention. In the illustrated embodiment, system 100 includes a service company 102 that provides services to a plurality of clients 104. Service company 102 may be communicatively coupled to client 104 via a communications network 106, which may be any suitable public or private network. Examples of communications network 106 is the Internet, Extranet, and a virtual private network.

Service company 102 may be any suitable entity that provides any suitable service to clients 104. In the illustrated embodiment, service company 102 is an information technology or business process outsourcing service provider that provides services and/or maintains operational environments for clients 104. These operational environments are sometimes mission critical operations for clients 104. As such, minimizing the risk of service outages for these mission critical operations is important. According to the teachings of one embodiment of the present invention, a method and system for addressing severe client service outages is provided by service company 102. In a particular embodiment of the invention, client service outages that are classified as severity level one ("SEV 1") are addressed. A severity level one client service outage is defined below. Also described in further detail below, these client service outages may occur within a key production environment ("KPE") 108 associated with a particular client 104.

As illustrated in FIG. 1A, clients 104 illustrate example KPE's 108. Client 104a illustrates a site 108a, which is any suitable physical location of client 104a. An example of site 108a is a manufacturing facility for automobiles. Client 104b illustrates a service 108b, which may be any suitable service provided to client 104b, such as a video teleconferencing service, automatic teller machine service, Lotus Notes, or other suitable service. Client 104c illustrates and application 108c, which may be any suitable application, such as a web-based application that allows customers to use the world wide web to search or conduct business with client 104c. Application 108c may be other suitable applications provided to client 104c. The present invention contemplates other KPE's for clients 104 and these are typically defined ahead of time by service company 102 and/or client 104.

A severe client service outage (such as a severity level one outage) may be defined in any suitable manner; however, in one embodiment, a severity level one client service outage is defined as a major operational problem within a KPE of a client that impacts that clients ability to conduct their business in a manner that there is no effective workaround available. A severity level one classification may be categorized by contractual requirements, performance expectations, critical business applications, client specific performance indicators, visibility to client executive leadership, or other suitable categorizations.

Because of the importance of restoring a severity level one client service outage, timely notification to appropriate employees of service company 102 is important so that a timely analysis and deployment of a service response team can be quickly implemented in order to restore the outage. Accordingly, in one embodiment, service company 102 includes notification channel 110, a production environment manager 112, service company employees 114a, a response to operational problems ("RtOP") tool 116 and a central repository 118. All of these components of service company 102 may be coupled to one another via a communications network 120.

Notification channel 110 represents any suitable employee or agent of service company 102 that functions to receive the initial indication that there is an operational problem with a KPE of a client. Any suitable employee or agent of service company 102 may be associated with notification channel 110, such as a data center employee, a solution center manager, or other suitable employee or agent. Such a person may become aware of an operational problem in any suitable manner. For example, it may be an employee at a data center receiving a call from a particular client 104 or it may be an employee that is monitoring a KPE 108 via communications network 106 and that notices that something has gone wrong. In any event, this person receives an indication of an operational problem and notifies production environment manager 112 via any suitable method. In one embodiment, the person utilizes RtOP tool 116 to determine the production environment manager for that particular KPE.

Production environment manager 112 receives information regarding an operational problem to a KPE of a client and makes a determination on whether or not the problem is a severity level one client service outage. This determination may be based on any suitable factors. Production environment manager 112 then utilizes RtOP tool 116 so that the severity level one client service outage may be addressed in a timely manner. Details of the utilization of RtOP tool 116 is described in further detail below in conjunction with FIGS. 3-5. Briefly, one of the functions of RtOP tool 116 is to automatically notify, on a timely basis, service company employees 114.

Service company employees 114a may be any suitable employees of service company 102 in which it is appropriate for them to know that a severity level one client service outage has occurred in a KPE of a client. For example, this may include a client executive, a client delivery executive, other production environment managers, members of a restoration team that are to address the client service outage, or other suitable employees. This initial notification typically occurs within a short amount of time. For example, the notification may take place within 15 minutes of the determination that a severity level one client service outage has occurred. Other suitable times may be utilized.

Also illustrated in FIG. 1A is service company employees 114b that are shown to be coupled to communications network 106. This merely indicates that particular service company employees may be outside the company and away from their computer. In this case they are notified via a mobile device, such as a pager, personal digital assistant, cell phone, or other suitable mobile device. Also illustrated in FIG. 1A is client employees 125, which illustrates that certain client employees of a particular client may be notified in a timely manner upon a severity level one determination. Again, client employees 125 may be notified in any suitable manner, such as through a mobile device similar to service company employees 114b or by sending an e-mail to their personal computer via communications network 106.

Figure 2:
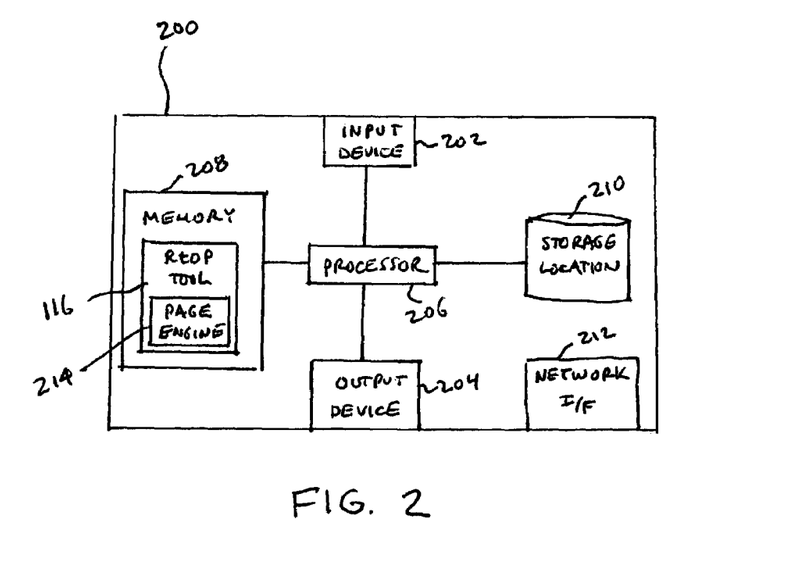
FIG. 2 is a block diagram of a server having a response to operational problems tool according to one embodiment of the present invention.

RtOP tool 116, which is described in greater detail below in conjunction with FIG. 2, is any suitable computer program, implemented in hardware, software, and/or firmware, that is operable to address a severity level one client service outage. RtOP tool 116, in one embodiment, resides on a server or across multiple servers within service company 102 or may be installed on individuals computers of employees of service company 102, such as production environment manager 112's computer. In any event, the functionality of RtOP tool 116 is accessible by employees of service company 102 in any suitable manner.

Central repository 118 may be any suitable storage location operable to store any suitable data or information regarding the severity level one client service outage. In one embodiment, central repository 118 is a relational database; however, other suitable databases or storage locations may be utilized. Central repository 118 may store predefined client service outage parameters associated with a particular client 104, such as the particular production environment manager or managers associated with a KPE of a client, employees of either service company 102 or client 104 that needs to be notified on a timely basis of a severity level one client service outage, other employees that may have a need-to-know about the client service outage, such as high level executives, names of the service restoration team members, a service restoration plan, or other suitable information.

Communications network 120 may be any suitable network associated with service company 102, such as a local area network, a wide area network, a virtual private network, or any other suitable network, public or private, that service company 102 utilizes for communication between employees and/or the various components of service company 102.

Figure 1B:
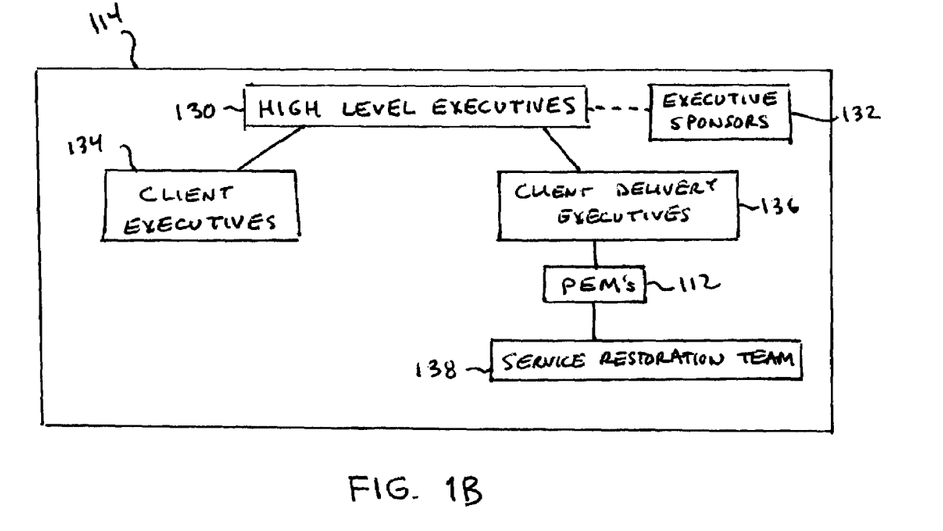
FIG. 1B is a block diagram illustrating an example hierarchy of appropriate service company personnel that may be notified when a client service outage is determined to be severity level 1.

Examples of service company employees 114 are illustrated in block diagram form in FIG. 1B. The employees are shown in an example hierarchy form; other suitable hierarchies and other suitable labels for these employees are contemplated by the present invention. Referring to FIG. 1B, service company employees 114 may include high level executives 130, executive sponsors 132, client executives 134, client delivery executives 136, production environment managers 112, and a restoration team 138.

High level executives are typically at the executive VP level of service company 102; however, high level executives 130 may also include other people such as presidents, CEO's, CIO's, CTO's, or other high level managers. Executive sponsors 132 may also be any suitable employee of service company 102; however, executive sponsors 132 typically exist for very large clients, such as enterprise clients or strategic relationship clients that are very important to service company 102. Client executives 134 typically work under high level executives 130 and focus on the client relationship side of the business with the client. For example, client executives 134 may deal with contract issues with a particular client or other suitable business relationship activities. Client delivery executives 136 are typically on the same level as a client executive; however, client delivery executives 136 are in charge of service delivery to a particular client, and may, in some circumstances, be a production environment manager 112 depending on how large the client is or how many KPEs are associated with a particular client. Production environment managers 112 typically work under client delivery executives 136 and are described above in conjunction with FIG. 1A. Service restoration team 138 works under the direction of production environment manager(s) 112 and carry out the restoration procedures for the severity level one client service outage so that it may be stored in a timely as well as quality manner.

FIG. 2 is a block diagram of a server 200 having RtOP tool 116 according to one embodiment of the present invention. As described above, although FIG. 2 illustrates only one server, RtOP tool 116 may be spread across multiple servers. In the illustrated embodiment in FIG. 2, server 200 includes an input device 202, and output device 204, a processor 206, a memory 208 storing RtOP tool 116, a storage location 210, and a network interface 212.

Input device 202 is coupled to server 200 for the purpose of inputting information, such as the information described above for the severity level one client service outage. In one embodiment, input device 202 is a keyboard; however, input device 202 may take other suitable forms, such as a mouse, a stylus or a scanner. Output device 204 may be any suitable visual display unit, such as an LCD or CRT display. Output device 204 may also be coupled to a printer for the purpose of printing out any desired information.

Processor 206 comprises any suitable processing unit that executes logic. One of the functions of processor 206 is to retrieve RtOP tool 116 from memory 208 and execute the functions of RtOP tool 116 based on the input into server 200. Processor 206 may also control the receiving, storing, and retrieving of information in storage location 210, central repository 118 (FIG. 1A), or any other suitable storage location. Other suitable functions of processor 206 are contemplated by the present invention.

RtOP tool 116, as described above, may be any suitable computer program or number of computer programs written in any suitable computer language that is operable, in one embodiment, to receive information indicative of a severity level one client service outage and automatically page, via a paging engine 214, appropriate personnel of service company 102 in order to notify the personnel of the outage. Other example functions of RtOP tool 116 are described below in conjunction with FIGS. 3-5. In the illustrated embodiment, RtOP tool 116 is logic encoded in memory 208. However, in alternative embodiments, RtOP tool 116 is implemented through application specific integrated circuits, field programmable gate arrays, digital signal processors, or other suitable specific or general purpose processors.

Memory 208 and storage location 210 may comprise files, stacks, databases, or other suitable organizations of volatile or non-volatile memory. Memory 208 and storage location 210 may be random access memory, read only memory, CD-ROM, removable memory devices or any other suitable devices that allow storage and/or retrieval of data. Memory 208 and storage location 210 are interchangeable and may perform the same functions.

Network interface 212 functions to allow server 200 to communicate with other devices and components in order to transmit and receive information. For example, network interface 212 may allow server 200 to communicate through communications network 120 and/or communications network 106. In one embodiment, network interface 212 is a network interface card; however, network interface 212 may be other devices suitable for receiving and transmitting signals, such as a modem or a digital subscriber line. Network interface 212, according to one embodiment, is also operable to send wireless signals to service company employees in remote locations, such as service company employees 114b (FIG. 1A).

Figure 3:
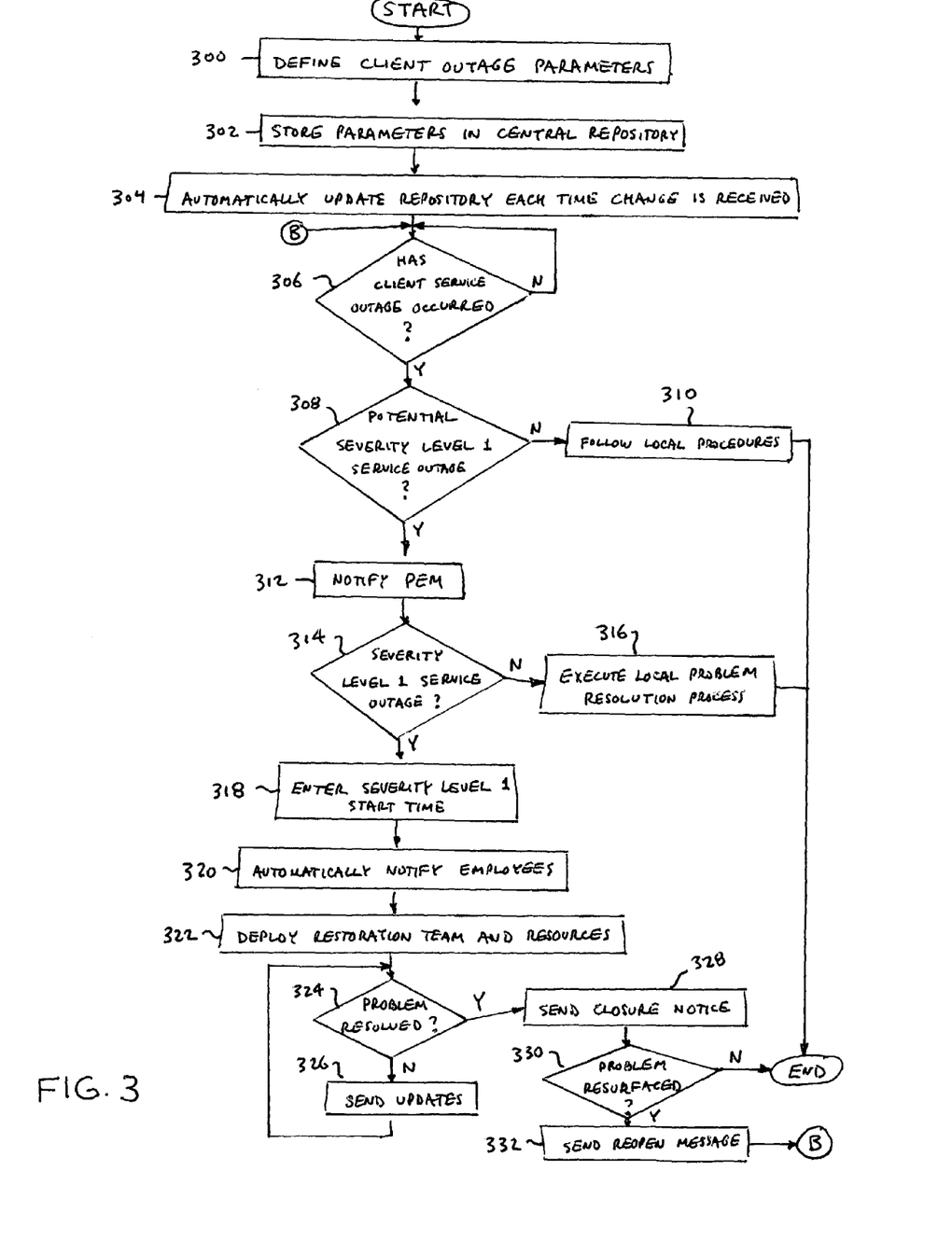
FIG. 3 is a flowchart illustrating an example method for addressing client service outages according to one embodiment of the present invention.

FIG. 3 is a flowchart illustrating an example method for addressing client service outages according to one embodiment of the present invention. FIG. 3 illustrates at least some of the functionality of RtOP tool 116.

The example method begins at step 300 where parameters associated with a client service outage are defined. These client service outage parameters are stored in central repository 118 (FIG. 1A), as denoted by step 302. Client service outage parameters may be any suitable parameters associated with a severity level one client service outage. For example, such parameters may include KPE(s), a production environment manager for a KPE, a client executive, a client delivery executive, a service restoration team, a service restoration plan, or other suitable parameters. These parameters may be changed at any given time by either a particular client 104 or an employee of service company 102. Accordingly, each time a change is received by RtOP tool 116, central repository 118 is automatically updated with the new information, as denoted by step 304.

At decisional step 306, a determination is made whether a client service outage has occurred. When a client service outage occurs, then, at decisional step 308, it is determined whether the client service outage is a potential severity level one outage. This determination may be made by an employee or agent of service company 102 associated with notification channel 110 (FIG. 1A). This employee may utilize information stored in central repository 118 or other suitable storage location to help determine whether or not it is a potential severity level one outage. If it is not, then local procedures are followed to clear up the operational problem, as denoted by step 310, and then the example method ends. However, if the outage is a potential severity level one outage, then at step 312, production environment manager 112 is notified. Production environment manager 112 may be notified in any suitable manner.

Production environment manager 112 then determines, as denoted by decisional step 314, whether the client service outage is a severity level one classification. If it is not a severity level one classification, then local problem resolution processes are executed, as denoted by step 316, and then the example method ends. However, if production environment manager 112 determines that a severity level one client service outage has occurred, then production environment manager 112 utilizes RtOP tool 116 to enter certain information regarding the outage. For example, as denoted by step 318, a start time for the severity level one client service outage is entered. This start time may be different from when a problem first occurred in a KPE of a client. In any event, RtOP tool 116, in response to receiving the information from production environment manager 112, then automatically notifies the appropriate employees of service company 102 and potentially client employees 125 (FIG. 1A) by paging or other suitable transmission means. This is denoted by step 320. Thereafter, a service restoration team and other suitable resources are deployed, as denoted by step 322, so that the outage may be addressed and remedial measures taken to restore the outage.

At decisional step 324, it is determined whether the operational problem has been resolved. In other words, has the client service outage been restored to its normal operation. If the client service outage has not been resolved, then updates are sent, as denoted by step 326 until the problem has been resolved. These updates may occur at any suitable time periods, such as one hour, or may not occur at all if no such updates exist. When the problem is resolved, a closure notice is transmitted to all appropriate personnel, as denoted by step 328. At decisional step 330, it is determined whether the problem has resurfaced. If the problem has not resurfaced, then the example method ends. If the problem has resurfaced, then the a "reopen" message is sent by any suitable means to appropriate employees. These employees will typically be the same employees that were initially notified when the outage first occurred. The method then continues back at decisional step 306, as described above. This then ends the example method outlined in FIG. 3.

Thus, RtOP tool 116, in one embodiment, provides timely notification in a consistent manner to all key stakeholders of service company 102 regarding severity level one client service outages. In addition, service restoration teams may be deployed in a timely manner to apply corrective and preventative actions for the client service outage. Among other advantages, responsiveness is accelerated and mean time to restoration ("MTTR") is optimized by utilizing RtOP tool 116.

Figure 4:
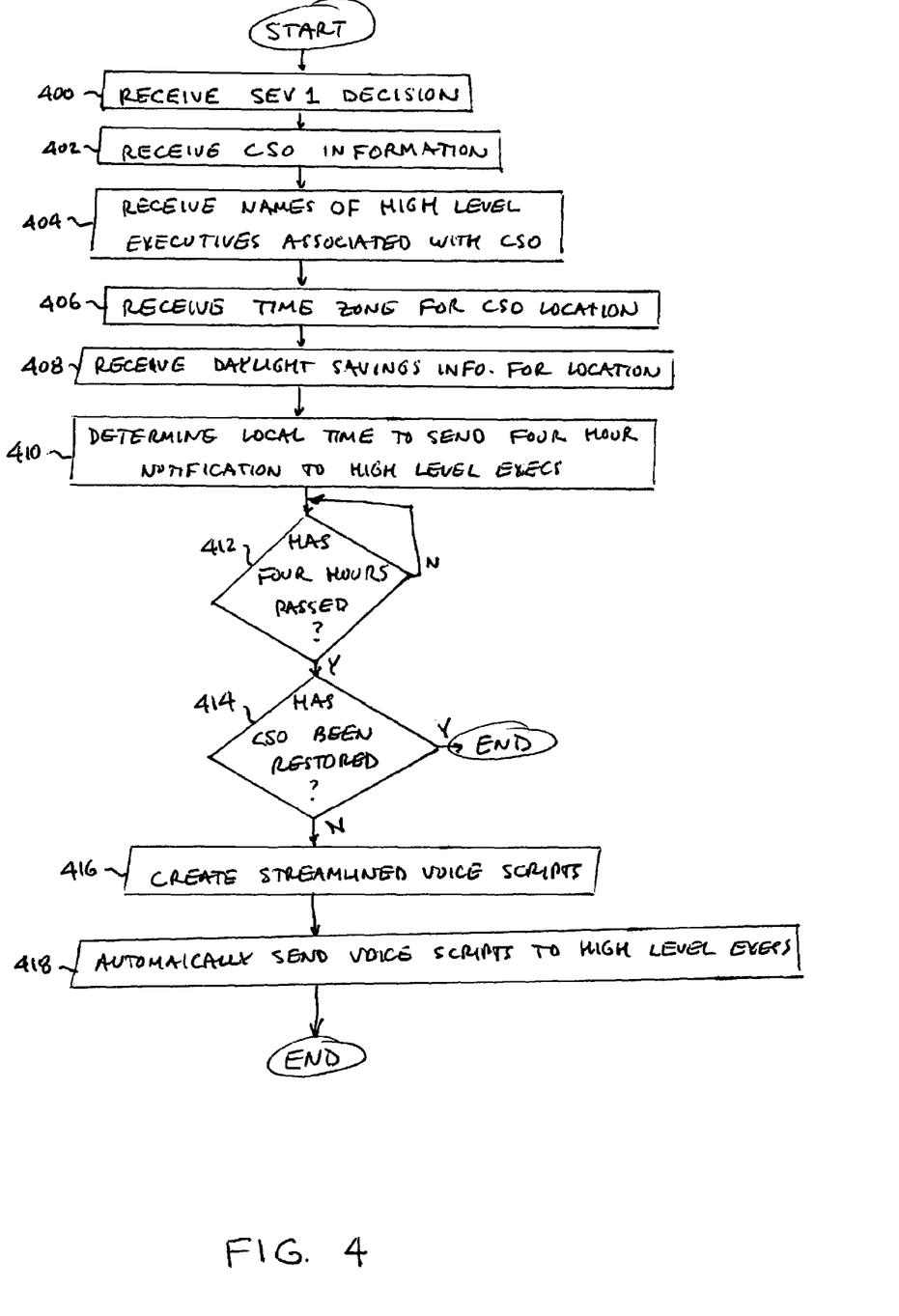
FIG. 4 is a flowchart illustrating an example method for notifying high level executives of a service company about a client service outage according to an embodiment of the present invention.

FIG. 4 is a flowchart illustrating an example method for notifying high level executives of service company 102 about a severity level one client service outage according to an embodiment of the present invention. FIG. 4 also illustrates some functionality of RtOP tool 116.

A severity level one client service outage decision is received by RtOP tool 116 at step 400. Information regarding the outage is received at step 402. Based on the information received, the names of the high level executives associated with a particular severity level one client service outage is received, as denoted by step 404. These high level executives are notified by RtOP tool 116 regarding the severity level one client service outage after a certain time period has passed, as described in more detail below.

A time zone for the client service outage location is received by RtOP tool 116 at step 406. This is typically input by production environment manager 112. In addition, daylight savings information for the location is received at step 408. In other words, production environment manager 112 denotes whether or not that particular time zone follows the daylight savings time. Based on the time zone and daylight savings time indication, and the time period in which the high level executives are to be notified, RtOP tool 116 automatically determines a local time to send a notification to the high level executives at step 410. Any suitable time period may be utilized; however, in one embodiment, a four hour notification time period is utilized.

At decisional step 412, it is determined whether or not the time period for notification has passed. In this example, the time period is four hours. When the four hours has passed, it is determined, at decisional step 414, whether the client service outage has been restored. If it has been restored, then the example method ends. However, if it has not been restored, then the four hour notice is to be sent to the high level executives. Before sending the notification, however, streamlined voice scripts are created, as denoted by step 416. These streamlined voice scripts are created by RtOP tool 116 and RtOP tool 116 essentially takes all the information inputted by production environment manager 112 and places the important information or the primary information up front and the secondary or less important information at the rear of the voice script. Accordingly, one or more voice scripts are automatically sent to the high level executives, as denoted by step 418.

An example of a voice script may be as follows. The important or primary information may include such things as an indication that this voice script is an RtOP notification, the client name, a short description of the problem, how many users it affects, a business impact (i.e., whether or not it is critical or not), a start date and time, an estimated time to restoration, the probable cause, and an action plan. Other suitable information may be included in the important or primary information. The voice script may also include administration information or less important information, such as an RtOP number, contact information, and other suitable administrative information.

Figure 5:
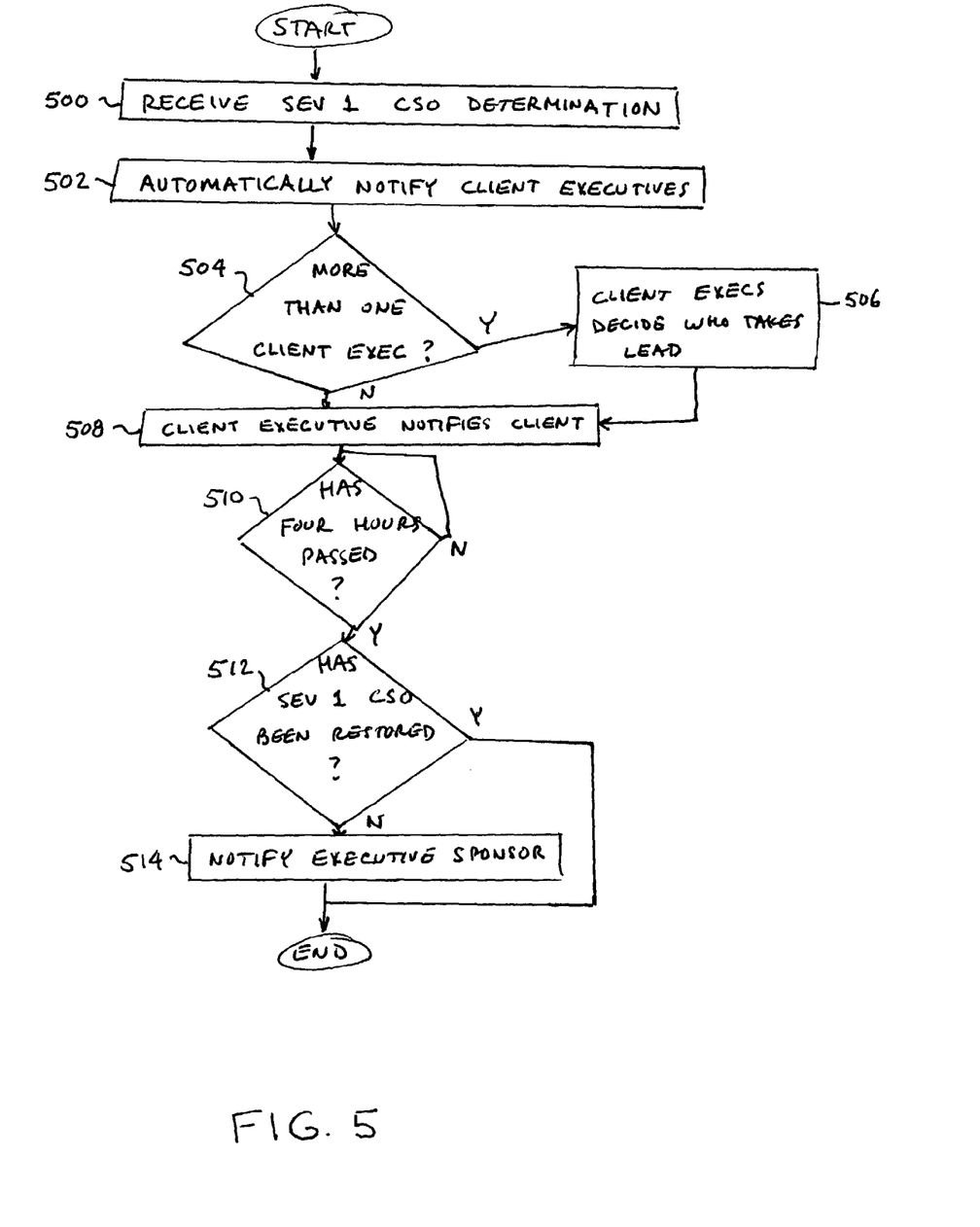
FIG. 5 is a flowchart illustrating an example method of notifying client executives and executive sponsors of a service company about a client service outage according to an embodiment of the present invention.

FIG. 5 is a flowchart illustrating an example method of notifying client executives and executive sponsors of service company 102 about a severity level one client service outage according to one embodiment of the present invention.

The example method begins at step 500 where a severity level one client service outage determination is received. Client executives are automatically notified by RtOP tool 116 at step 502. This may be facilitated by any suitable means, such as paging, voice scripts, or other suitable transmission means. At decisional step 504 it is determined whether or not there is more than one client executive for that particular client. If more than one client executive exists, then the client executives collaborate and decide who will take the lead in working with the client in order to maintain a good relationship with that client.

In any event, the lead client executive notifies the client about the severity level one client service outage at step 508. This notification typically happens within a very short time period after the start time for the client service outage has been determined. At decisional step 510 it is determined whether or not a predetermined time period has passed (in this example, four hours). When four hours has passed (or other suitable time period), then it is determined at decisional step 512, whether or not the severity level one client service outage has been restored. If it has been restored, then the example method ends. However, if it has not been restored, then the executive sponsor is notified by the client executive at step 514. Again, the executive sponsor is typically associated with a client that is an enterprise client or a strategic relationship client. This then ends the example method outlined in FIG. 5.

Thus, the example method outlined in FIG. 5 assures that the right employees of service company 102 are notified on a timely basis so that the relationship with the particular client is maintained at a high level.

Although the present invention is described with several example embodiments, various changes and modifications may be suggested to one skilled in the art. The present invention intends to encompass those changes and modifications as they fall within the scope of the claims.

What is claimed is:

1. A computerized method for addressing client service outages of a client, comprising:
    receiving and storing a plurality of predefined parameters of a client service outage in a central repository;
    receiving a change to one or more of the predefined parameters;
    automatically updating, using a computer system, the central repository based on the change;
    receiving information regarding the client service outage;
    determining, based on the received information, that the client service outage is of a particular severity level;
    receiving a start time for the client service outage;

determining a time zone based on a location of the client service outage;
receiving a daylight savings time indication for the time zone;
automatically determining, using the computer system, based on the start time, the time zone, the daylight savings time indication, and a predetermined wait period, when to send a voice script to one or more persons associated with the service company, the voice script including a portion of the received information;
identifying that the predetermined wait period has expired;
automatically organizing, using the computer system, the portion of the information of the voice script into primary information and secondary information to generate a streamlined voice script; and
automatically sending, using the computer system, the streamlined voice script to the one or more persons if the client service outage has not been restored, wherein the primary information is sent before the secondary information.

2. The computerized method of claim 1, further comprising automatically sending at least a portion of the information to one or more employees of a service company within one hour from the start time.

3. The computerized method of claim 2, further comprising:
receiving an update to the information during the predetermined wait period; and
in response to receiving the update, automatically sending the update to one or more employees of the service company.

4. The computerized method of claim 1, wherein receiving the plurality of predefined parameters comprises receiving at least a key production environment of a client, a production environment manager, a client executive, a service restoration team, and a service restoration plan.

5. The computerized method of claim 1, wherein determining that the client service outage is of a particular severity level comprises receiving an indication that the client service outage is of a particular severity level.

6. The computerized method of claim 1, wherein determining that the client service outage is of a particular severity level comprises comparing the received information to one or more predefined criteria.

7. The computerized method of claim 1, wherein automatically sending comprises automatically paging.

8. The computerized method of claim 1, wherein automatically sending the streamlined voice script comprises automatically transmitting the streamlined voice script.

9. A computerized method for addressing client service outages of a client, comprising:
receiving a plurality of predefined parameters of a client service outage;
storing the predefined parameters in a central repository;
receiving information regarding a client service outage;
receiving an indication that the client service outage is of a particular severity level;
in response to receiving the indication:
identifying that a predetermined wait period has expired;
automatically organizing, using a computer system, a voice script comprising at least a portion of the received information into primary information and secondary information to generate a streamlined voice script; and
automatically sending, using the computer system, the streamlined voice script to one or more employees of a service company if the client service outage has not been restored, wherein the primary information is sent before the secondary information;
receiving a change to one or more of the predefined parameters; and
automatically updating, using the computer system, the central repository based on the change.

10. The computerized method of claim 9, wherein receiving the plurality of predefined parameters comprises receiving at least a key production environment of a client.

11. The computerized method of claim 9, further comprising:
receiving an update to the information; and
in response to receiving the update, automatically sending the update to the one or more employees.

12. The computerized method of claim 9, further comprising:
receiving a start time for the severity level one client service outage;
receiving a time zone based on the location of the client service outage;
receiving a daylight savings time indication for the time zone; and
automatically determining, based on the time zone, the daylight savings time indication, and a predetermined wait period, when to send the streamlined voice script to the one or more employees of the service company, the one or more employees comprising one or more high level executives of the service company.

13. The computerized method of claim 12, further comprising:
identifying that the predetermined wait period has expired; and
automatically sending the streamlined voice script to the one or more high level executives if the client service outage has not been restored.

14. The computerized method of claim 9, wherein automatically sending comprises automatically paging.

15. A computerized method for addressing client service outages of a client, comprising:
receiving and storing a plurality of predefined parameters of a client service outage in a central repository;
receiving information regarding the client service outage;
determining, based on the received information, that the client service outage is of a particular severity level;
receiving a start time for the client service outage;
determining a time zone based on a location of the client service outage;
receiving a daylight savings time indication for the time zone;
automatically determine, using a computer system, based on the start time, the time zone, the daylight savings time indication, and a predetermined wait period, when to send a voice script to one or more persons associated with the service company, the voice script including a portion of the received information;
identifying that the predetermined wait period has expired; and
automatically sending, using the computer system, the voice script to the one or more persons if the client service outage has not been restored.

16. The computerized method of claim 15, further comprising:
automatically organizing the voice script into primary information and secondary information; and
wherein automatically sending the voice script to the one or more persons if the client service outage has not been restored comprises automatically sending the primary information before the secondary information.

17. The computerized method of claim 15, further comprising:
   receiving a change to one or more of the predefined parameters;
   automatically updating the central repository based on the change.

18. The computerized method of claim 15, further comprising automatically sending at least a portion of the information to one or more employees of a service company within one hour from the start time.

19. The computerized method of claim 18, further comprising:
   receiving an update to the information during the predetermined wait period; and
   in response to receiving the update, automatically sending the update to one or more employees of the service company.

20. The computerized method of claim 15, wherein receiving the plurality of predefined parameters comprises receiving at least a key production environment of a client, a production environment manager, a client executive, a service restoration team, and a service restoration plan.

21. The computerized method of claim 15, wherein automatically sending comprises automatically paging.

22. The computerized method of claim 15, wherein automatically sending comprises automatically transmitting voice scripts.

23. The computerized method of claim 15, wherein:
   one of the employees of the service company is a client executive; and
   the method further comprises notifying, by the client executive, an executive sponsor of the client after a predetermined time period if the client service outage has not been restored.

24. Logic encoded in computer-readable media for use by a company in addressing client service outages of a client, the logic when executed by a computer system operable to perform the following steps:
   receive a plurality of predefined parameters of a client service outage;
   store the predefined parameters in a central repository;
   receive information regarding a client service outage;
   receive an indication that the client service outage is of a particular severity level;
   in response to receiving the indication:
      identify that a predetermined wait period has expired;
      automatically organize a voice script comprising at least a portion of the received information into primary information and secondary information to generate a streamlined voice script; and
      automatically sending the streamlined voice script to one or more employees of a service company if the client service outage has not been restored, wherein the primary information is sent before the secondary information;
   receive a change to one or more of the predefined parameters; and
   automatically update the central repository based on the change.

* * * * *

UNITED STATES PATENT AND TRADEMARK OFFICE
CERTIFICATE OF CORRECTION

| | | |
|---|---|---|
| PATENT NO. | : 7,562,024 B2 | Page 1 of 1 |
| APPLICATION NO. | : 10/465481 | |
| DATED | : July 14, 2009 | |
| INVENTOR(S) | : Clifford Brooks et al. | |

It is certified that error appears in the above-identified patent and that said Letters Patent is hereby corrected as shown below:

In column 10, line 51, in Claim 15, delete "determine" and insert -- determining --, therefor.

Signed and Sealed this

Twenty-fourth Day of November, 2009

David J. Kappos
*Director of the United States Patent and Trademark Office*